(12) United States Patent
Kubota et al.

(10) Patent No.: US 6,818,338 B2
(45) Date of Patent: Nov. 16, 2004

(54) FUEL CELL ASSEMBLY

(75) Inventors: Tadahiro Kubota, Wako (JP); Nariaki Kuriyama, Wako (JP); Jun Sasahara, Wako (JP)

(73) Assignee: Honda Giken Kogyo Kabushiki Kaisha (JP)

(*) Notice: Subject to any disclaimer, the term of this patent is extended or adjusted under 35 U.S.C. 154(b) by 149 days.

(21) Appl. No.: 10/275,641

(22) PCT Filed: May 2, 2001

(86) PCT No.: PCT/JP01/03807
§ 371 (c)(1),
(2), (4) Date: Nov. 6, 2002

(87) PCT Pub. No.: WO01/56144
PCT Pub. Date: Nov. 15, 2001

(65) Prior Publication Data
US 2003/0077502 A1 Apr. 24, 2003

Related U.S. Application Data

(60) Provisional application No. 60/202,827, filed on May 8, 2000.

(51) Int. Cl.[7] .................................................. H01M 8/04
(52) U.S. Cl. ............................ 429/26; 429/30; 429/33; 429/39
(58) Field of Search ............................ 429/26, 30, 33, 429/39

(56) References Cited

U.S. PATENT DOCUMENTS

| | | | | |
|---|---|---|---|---|
| 6,258,474 B1 | * | 7/2001 | Diethelm et al. | 429/26 |
| 2002/0068202 A1 | * | 6/2002 | Gebhardt et al. | 429/13 |
| 2002/0068207 A1 | * | 6/2002 | Baldauf et al. | 429/26 |

FOREIGN PATENT DOCUMENTS

| | | |
|---|---|---|
| JP | UM 58-176367 | 11/1983 |
| JP | 4229956 | 8/1992 |
| JP | 2001043877 | 2/2001 |

* cited by examiner

Primary Examiner—John S. Maples
(74) Attorney, Agent, or Firm—Lumen Intellectual Property Services, Inc.

(57) ABSTRACT

A fuel cell assembly is provided with at least one cell including an electrolyte layer, a pair of gas diffusion electrode layers interposing the electrolyte layer between them, and a pair of flow distribution plates for defining passages for fuel and oxidizer gases that contact the gas diffusion electrode layers. The electrolyte layer includes a grid frame provided with a plurality of through holes, and electrolyte retained in each through hole, heater wire being disposed in a grid bar of the grid frame so that the entire catalyst and electrolyte may be heated up to a desired temperature suitable for the reaction, instead of being heated only locally, in a short period of time, and the desired output can be obtained in a short period of time following the start-up.

3 Claims, 5 Drawing Sheets

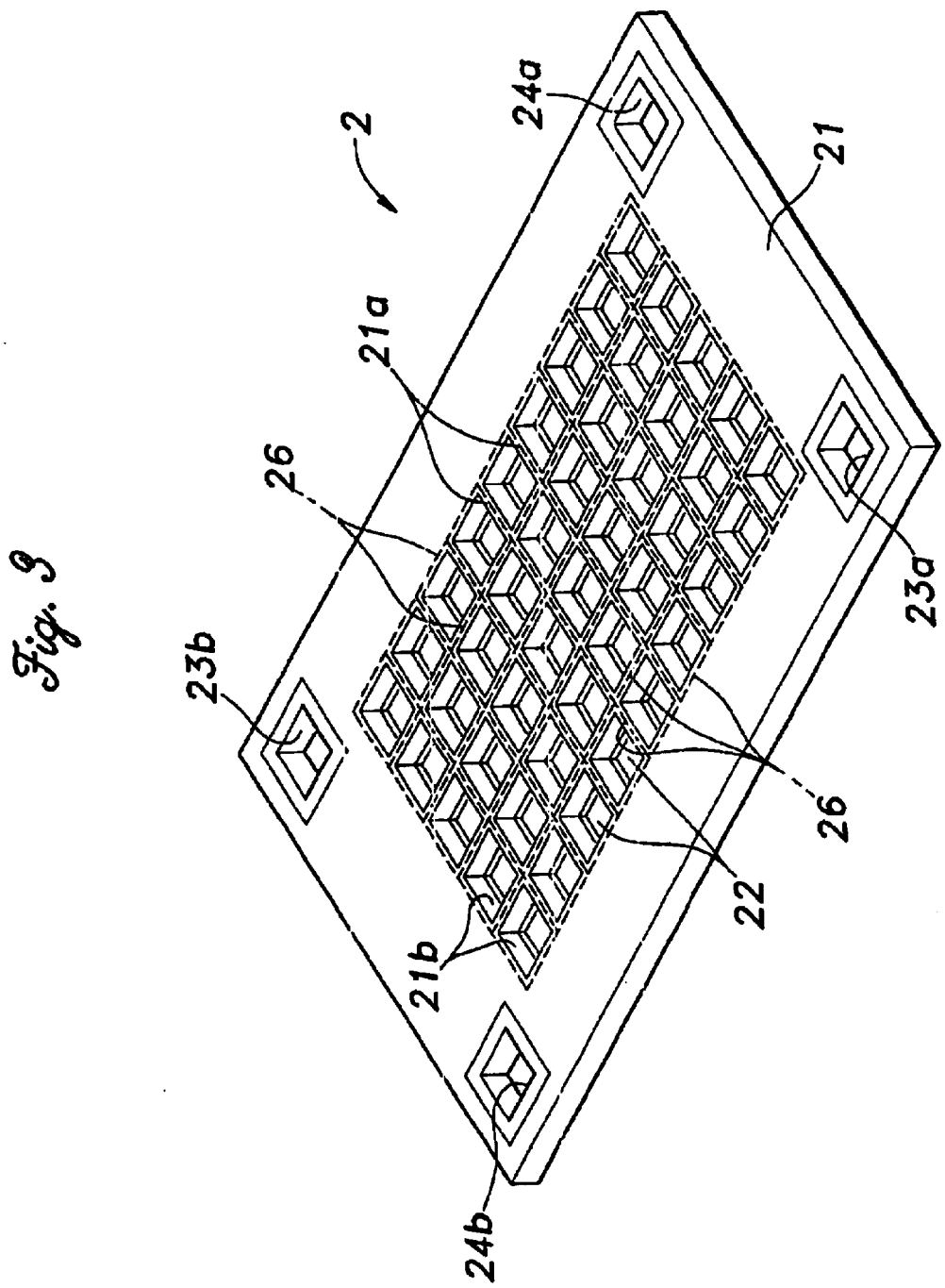

FUEL CELL ASSEMBLY

CROSS-REFERENCE TO RELATED APPLICATIONS

This application is cross-referenced to and claims priority from PCT International Application PCT/JP01/03807 filed on May 2, 2001, U.S. Provisional Application No. 60/202,827 filed on May 8, 2000 and U.S. Provisional Application No. 60/242,136 filed on Oct. 23, 2000, which are hereby incorporated by reference.

FIELD OF THE INVENTION

The present invention relates to a fuel cell assembly with at least one fuel cell including an electrolyte layer, a pair of gas diffusion electrode layers placed on either side of the electrolyte layer, and a pair of flow distribution plates placed on either outer side of the gas diffusion electrode layers to define passages for distributing fuel gas and oxidizing gas in cooperation with the opposing surfaces of the gas diffusion electrode layers.

BACKGROUND

A fuel cell includes an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be referred to as the phosphoric acid type, solid polymer type or molten carbonate type.

In particular, the solid polymer electrolyte (SPE) type fuel cell using an ion-exchange resin membrane for the electrolyte layer is considered to be highly promising because of the possibility of compact design, low operating temperature (100° C. or lower), and high efficiency as compared to the SOFC.

The SPE typically includes an ion-exchange resin membrane made of perfluorocarbonsulfonic acid, phenolsulfonic acid, polyethylenesulfonic acid, polytrifluorosulfonic acid, and so on. A porous carbon sheet impregnated with a catalyst such as platinum powder is placed on each side of the ion-exchange resin membrane to serve as a gas diffusion electrode layer. This assembly is referred to as a membrane-electrode assembly (MEA). A fuel cell can be formed by defining a fuel gas passage on one side of the MEA and an oxidizing gas passage on the other side of the MEA by using flow distribution plates (separators).

Typically, a large number of such fuel cells are stacked, and the flow distribution plates are shared by the adjacent fuel cells of the same stack. It is necessary to heat the fuel cell stack to a temperature of 80° C. to 90° C. to promote the electrochemical reaction in each fuel cell. Conventionally, either the entire stack was heated or the peripheral part of each fuel cell was heated.

However, a desired output cannot be obtained within a short period of time from the start up because a certain time period is required for the heat to reach the central part of the SPE. Such a delay may cause an unstable condition of the circuit, which is powered by the fuel cell, or a delay in achieving a fully operative condition of the circuit.

Accordingly, there is need to eliminate such problems in the prior art, and it is therefore a primary object of the present invention to provide a fuel cell assembly that can produce a desired output immediately after the start-up.

SUMMARY OF THE INVENTION

According to the present invention, such an object is accomplished by providing a fuel cell assembly with at least one cell including an electrolyte layer 2, a pair of gas diffusion electrode layers 3 and 4 interposing the electrolyte layer 2 between them, and a pair of flow distribution plates 5 for defining passages 10 and 11 for fuel and oxidizer gases that contact the gas diffusion electrode layers 3 and 4, characterized by that: the electrolyte layer 2 includes a grid frame 21 provided with a multitude of through holes 21b, and electrolyte 22 retained in each through hole 21b, heater wire 26 being disposed in a grid bar 21a of the frame 21.

Thus, at start-up, the heater wire 26 disposed in the grid bar 21a of the frame 21 can warm the entire catalyst 3b and 4b and electrolyte 22 to a desired temperature, instead of heating them only locally, so that the desired output can be obtained in a short period of time following the start-up.

In particular, it is preferable that the heater wire 26 is placed on one side or each side of the grid frame 21, and includes of a normal heater wire or film heater wire covered by an insulating layer 27. The heater wire 26 may generate heat either by conduction of electric current or conduction of heat from outside.

Other features and advantages of the present invention will become apparent from the following description with reference to the appended drawings.

BRIEF DESCRIPTION OF THE FIGURES

The objectives and advantages of the present invention will be understood by reading the following detailed description in conjunction with the drawings, in which:

FIG. 3 is an enlarged perspective view showing only the electrolyte layer of the fuel cell assembly according to the present invention;

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
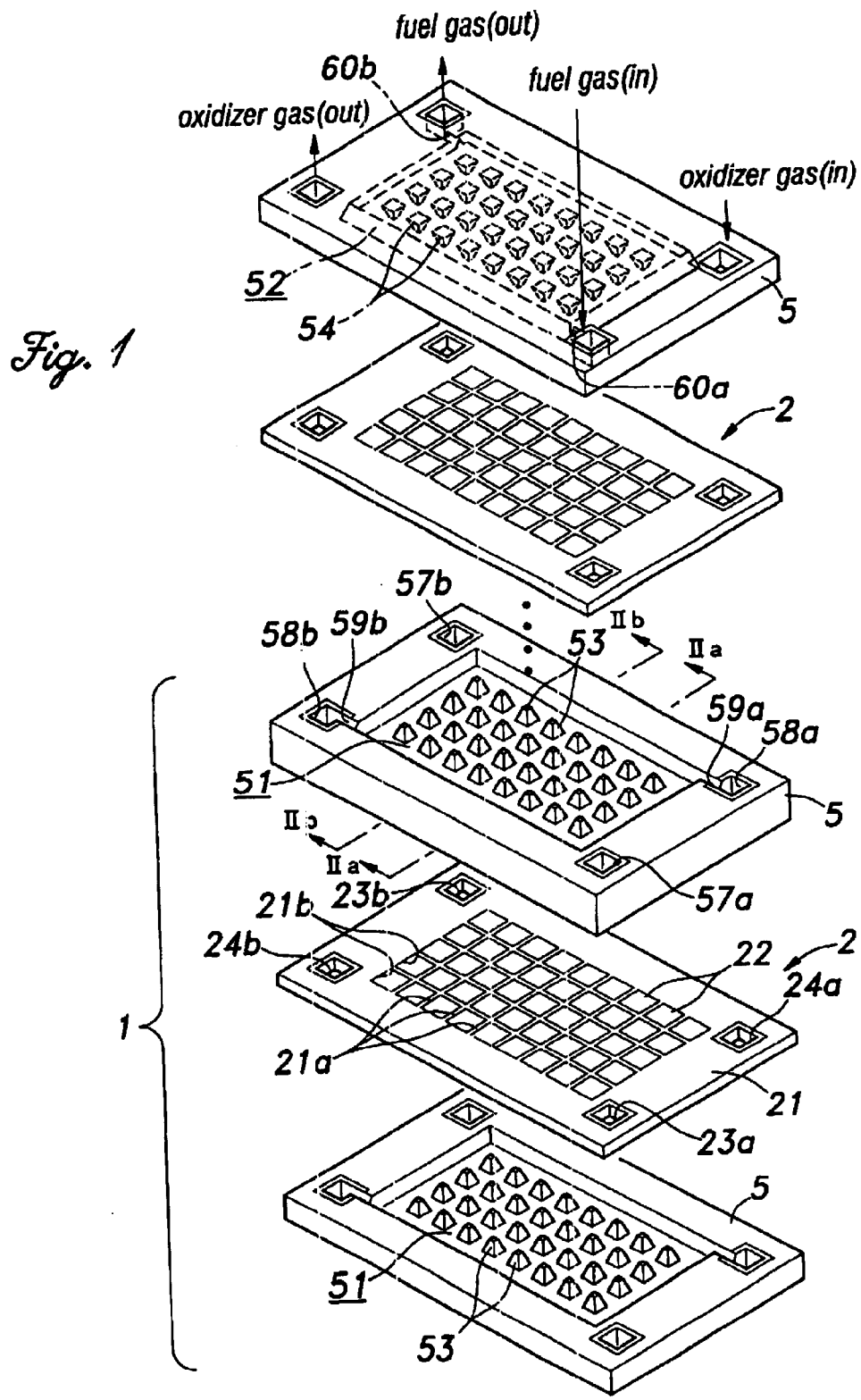
FIG. 1 is an exploded perspective view of a fuel cell assembly according to the present invention.

FIG. 1 is a perspective view of the structure of a fuel cell stack embodying the present invention. In practice, a number of such stacks are connected in series and/or parallel. Fuel such as reformed alcohol, hydrogen gas or the like is supplied to each fuel cell stack along with oxidizing gas such as air.

Figure 2A:
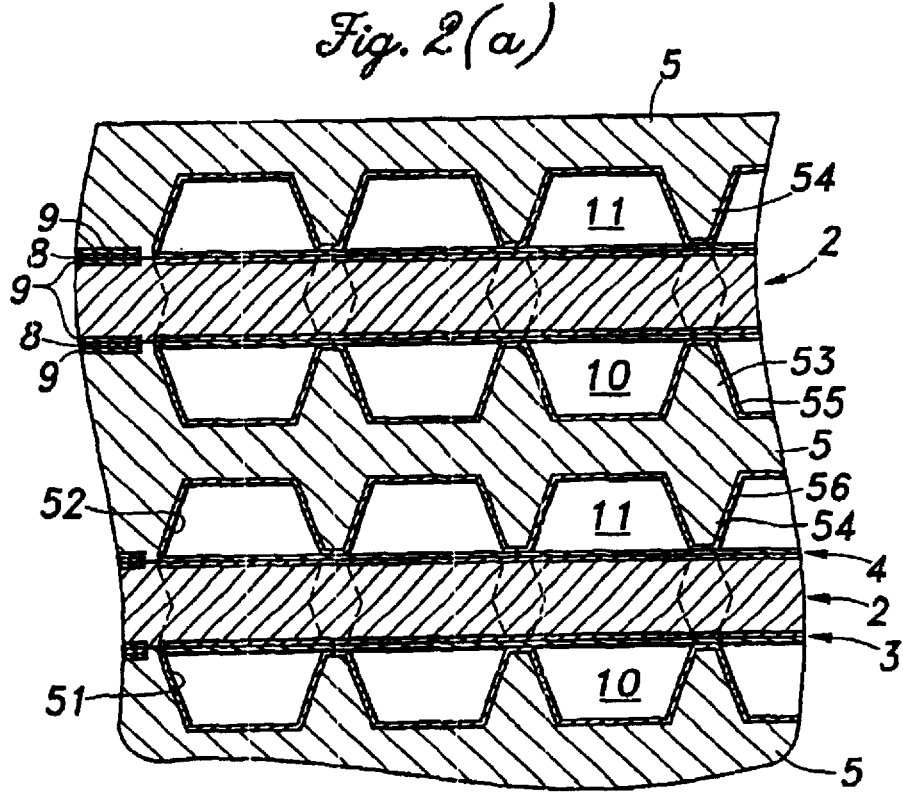
FIG. 2A is a fragmentary enlarged sectional view taken along line IIa—IIa of FIG. 1.
Figure 2B:
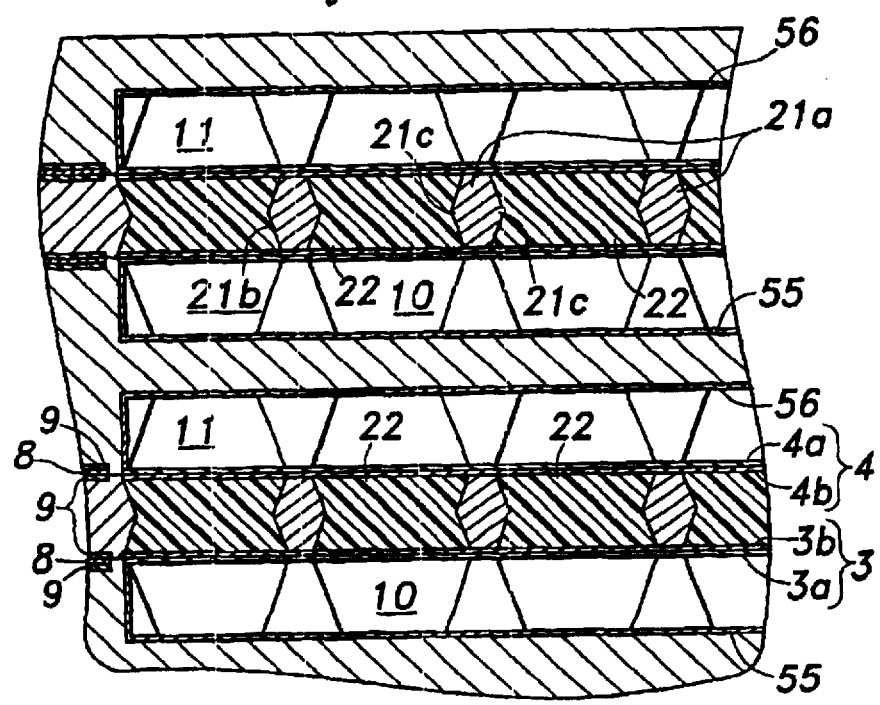
FIG. 2B is a fragmentary enlarged sectional view taken along line IIb—IIb of FIG. 1.
Figure 4A:
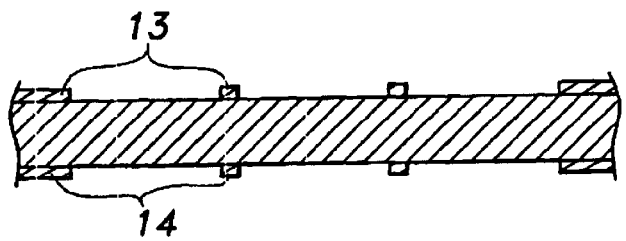
FIGS. 4a–4d are sectional views of the electrolyte layer in different steps of the fabrication process.
Figure 4B:
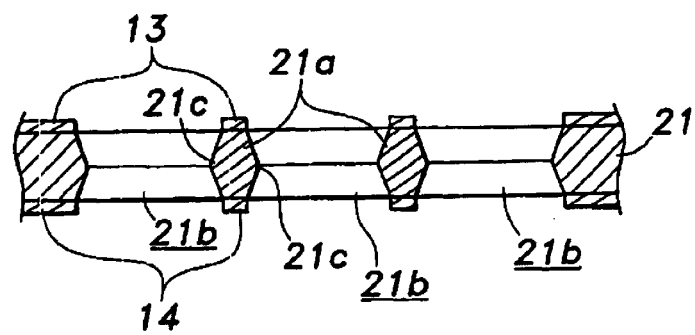
Figure 4C:
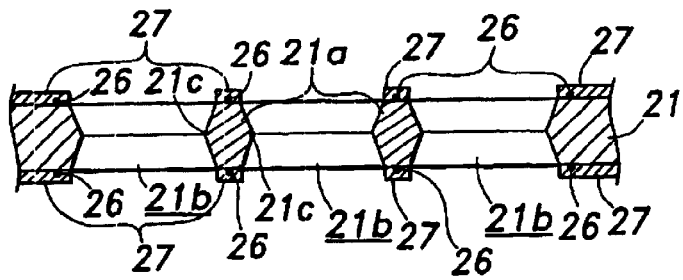
Figure 4D:
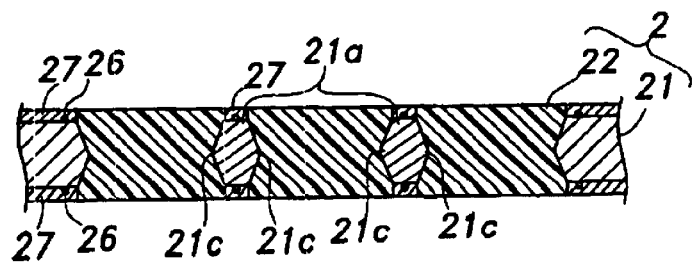

Each fuel cell stack is formed of a plurality of fuel cells 1. Referring also to FIGS. 2a and 2b, each fuel cell 1 includes a central electrolyte layer 2, a pair of gas diffusion electrode layers 3 and 4 placed on either side of the central electrolyte layer 2, and a pair of flow distribution plates 5 placed on either outer side of the gas diffusion electrode layers 3 and 4. Each flow distribution plate 5 serves also as the flow distribution plate for the adjacent fuel cell.

The electrolyte layer 2 includes a grid frame 21, and solid polymer electrolyte (SPE) 22 which is filled into through holes 21b defined between adjacent grid bars 21a of the grid frame 21. The SPE 22 could be made from materials such as perfluorocarbonsulfonic acid, phenolsulfonic acid, polyethylenesulfonic acid, polytrifluorosulfonic acid, and so on.

The grid frame 21 is formed by etching a silicon wafer or other material that are suitable for etching. Each grid bar 21a in the grid area of the grid frame 21 is provided with a projection 21c at an (depth-wise) intermediate part thereof so as to securely retain the SPE 22. As shown in FIG. 3, a heater 26 includes of resistive wire connected to an electric power source (not shown) is provided on the front and reverse surfaces of each bar 21a of the grid frame 21 facing the flow distribution plates 5. The heater 26 includes a normal electro-resistive wire in the illustrated embodiment, but may also include a film that can serve as a heater. It is also possible to provide a tubular heater through which heated fluid circulates, or a thermally highly conductive metallic member that is connected to a heat source (not shown).

As shown in FIGS. 4a–4d, a suitably patterned photoresist layer 13 and 14 is placed on each side of a silicon wafer, and an anisotropic etching is performed from both sides of the wafer. This produces a plurality of through holes 21b each of which is narrowed in a middle part by a projection 21c. Thereafter, resistive heater 26 is arranged on each side of the grid frame 21, and covered by an insulating film 27 in a per se known manner.

Through holes 23a and 23b are formed in diagonally opposing corners of the grid frame 21 to serve as an inlet and outlet for the fuel gas. Through holes 24a and 24b are formed in the remaining diagonally opposing corners of the grid frame 21 to serve as an inlet and outlet for the oxidizing gas.

Each flow distribution plate 5 is also formed by working a silicon wafer. A recess 51 or 52 is formed centrally on each side of the flow distribution plate 5, and a plurality of projections 53 or 54, each having the shape of a truncated pyramid, are formed in these recesses 51 and 52. The surface of the recesses 51 and 52 and the projections 53 and 54 are coated with a gold plate layer serving as an electrode terminal layer 55 and 56 in a per se known manner for electrically connecting the gas diffusion electrode layers 3 and 4 to an external circuit.

Figure 5A:
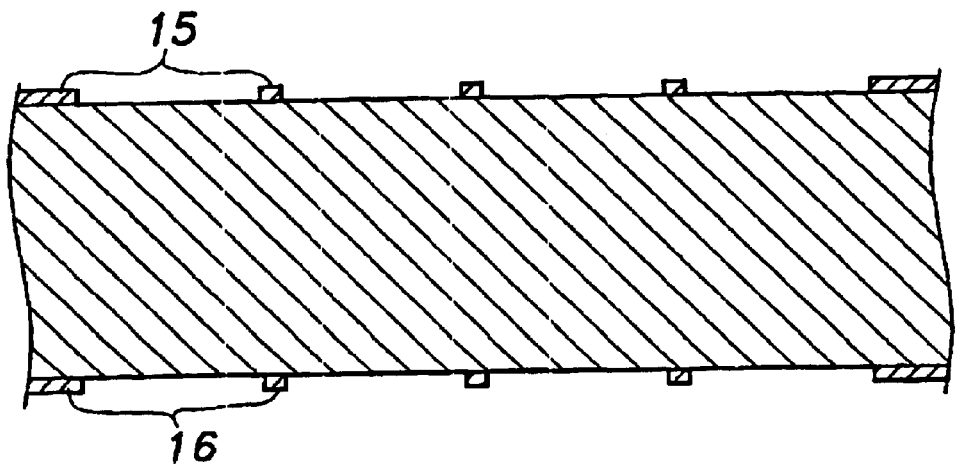
FIGS. 5a–5c are sectional views of the flow distribution plate in different steps of the fabrication process.
Figure 5B:
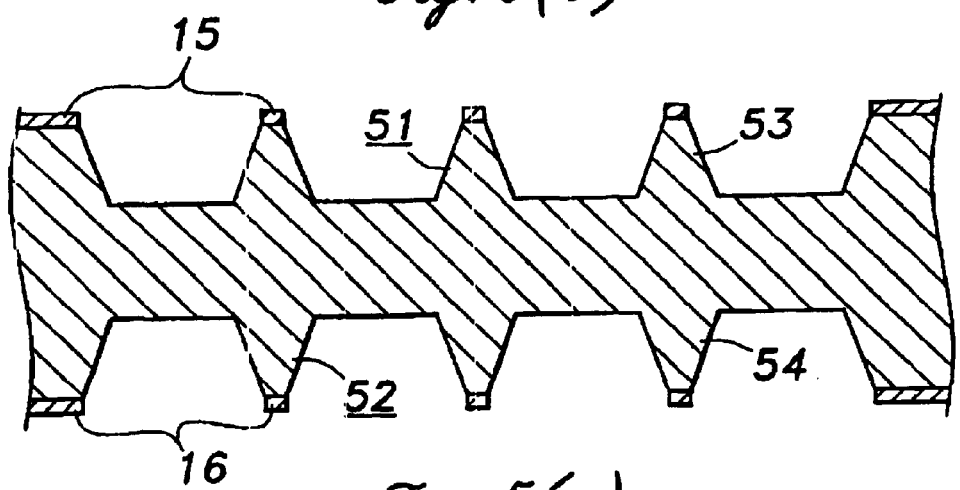
Figure 5C:
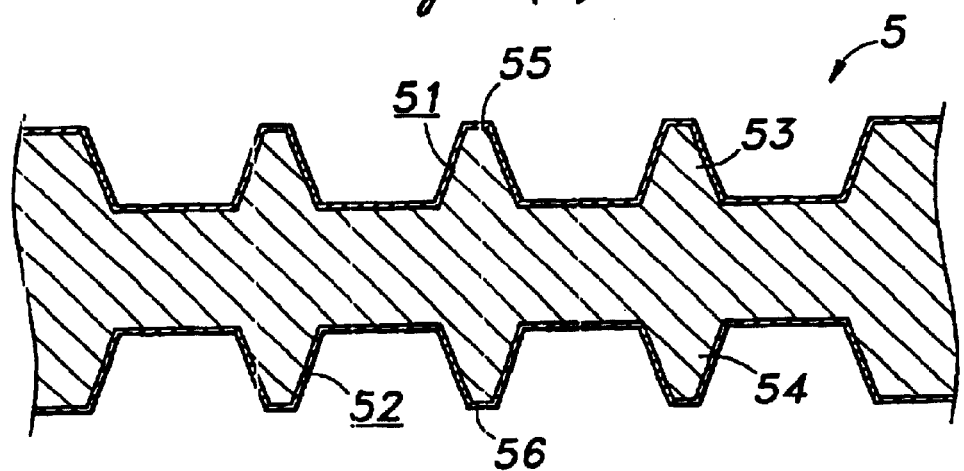

FIGS. 5a–5c show the process of forming each flow distribution plate 5. A suitably patterned photoresist layer 15 and 16 is formed on each side of a silicon wafer, and the silicon wafer is anisotropically etched from both sides to form the recesses 51 and 52 and projections 53 and 54. The electrode terminal layers 55 and 56 are then formed on the surfaces of the recesses 51 and 52 and projections 53 and 54. The distribution plate 5 on the upper end or lower end of each fuel cell stack may be provided with a recess and projections only on the inner side thereof.

Through holes 57a and 57b are formed in diagonally opposing corners of the flow distribution plate 5 to serve as an inlet and outlet for the fuel gas. Through holes 58a and 58b are formed in the remaining diagonally opposing corners of the flow distribution plate 5 to serve as an inlet and outlet for the oxidizing gas. As shown in FIG. 1, grooves 59a and 59b communicate the recess 51 with the through holes 58a and 58b, respectively, and similar grooves 60a and 60b communicate the recess 52 with the through holes 57a and 57b, respectively.

The gas diffusion electrode layers 3 and 4 each include a carbon paper or porous carbon sheet 3a or 4a having a layer of a platinum catalyst 3b and 4b mixed with SPE similar to the SPE 22 of the electrolyte layer placed near the surfaces thereof facing the electrolyte layer 2.

A pair of flow distribution plates 5 are placed on either side of each electrolyte layer 2 via a gas diffusion electrode layer 3 or 4, and these components are joined by anodic bonding entirely along the parts surrounding the recesses 51 and 52 in an air tight manner. Therefore, a plurality of air passages 10 are defined in one of the central recesses 51 for the oxidizing gas, and a plurality of similar fuel gas passages 11 are defined in the other of the central recesses 52 for the fuel gas.

The anodic bonding is now described in the following example. An electrode layer 9 and a layer 8 of heat resistant and hard glass, for instance, made of Pyrex glass (Tradename) are formed along the entire peripheral surface of the grid frame 21 of the electrolyte layer 2 on each side thereof by sputtering, and a similar electrode layer 9 is formed along the entire peripheral part of the opposing surface of each distribution plate 5.

Then, typically, with this assembly heated to about 400° C. at which sodium ions in the glass become fairly mobile, an electric field is produced in the assembly so as to move ions. In the fuel cell assembly of the present invention, if the electrolyte includes a solid polymer, heating the entire assembly to the temperature of 400° C. may damage the solid electrolyte. Therefore, according to this embodiment, a heater (not shown) is placed under the electrode layer 9 to selectively heat only the peripheral part of the flow distribution plates 5. The heater may include polycrystalline silicon sandwiched between insulating layers such as $Si_3N_4$ layers. If the electrode terminal layer 55 and 56 extend under the heater, the thermal efficiency of the heater will be impaired. Therefore, it is preferable to omit the electrode terminal layer 55 and 56 from under the heater.

The grid frame 21 and the distribution plates 5 are placed one over another, and compressed at a pressure of 100 $gf/cm^2$ to 2,000 $gf/cm^2$. Electric current is conducted through the polycrystalline silicon heater to locally heat the bonded area to a temperature in the order of 400° C. At the same time, a voltage in the order of 100 to 500 V is applied between the grid frame 21 and the electrode layer 9 of the distribution plate 5 for 10 to 30 minutes.

Other bonding methods may be used instead of the anodic bonding. For instance, a bonding agent may be used for attaching the grid frame 21 and the distribution plates 5 together. In either case, it is possible to eliminate the need for any sealing arrangements or clamping arrangements to achieve a desired sealing capability, and this allows a compact design of the fuel cell assembly.

As the fuel gas and oxidizing gas (air) are going through this fuel cell 1, while the catalyst and electrolyte of the fuel cell 1 (where the reaction takes place) and/or an area adjacent thereto is heated by the heater 26, an electrochemical reaction takes places by virtue of the platinum catalyst, and an electric voltage develops between the electrode terminal layers 55 and 56. A number of such fuel cells are stacked so that a desired voltage can be obtained.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the fuel gas in the illustrated embodiment includes gas such as hydrogen and alcohol, but liquid fuel may also be used. The oxidizing agent may likewise be in a liquid form. In such a case, the gas diffusion electrodes may include simple diffusion electrodes. All such variations are considered to be within the scope and spirit of the present invention as defined by the following claims and their legal equivalents.

What is claimed is:

1. A fuel cell assembly comprising:
   (a) at least one cell including an electrolyte layer;
   (b) a pair of gas diffusion electrode layers interposing said electrolyte layer between them; and
   (c) a pair of flow distribution plates for defining passages for fuel and oxidizer gases that contact said gas diffusion electrode layers so that said electrolyte layer comprises a grid frame provided with a plurality of through holes, and electrolyte retained in each through hole, and heater wire being disposed in a grid bar of said grid frame.

2. A fuel cell assembly as set forth in claim 1, wherein said heater wire is placed on one side or each side of said grid frame, and comprises of a normal heater wire or film heater wire covered by an insulating layer.

3. A fuel cell assembly as set forth in claim 1, wherein said heater wire is adapted to generate heat either by conduction of electric current or conduction of heat from outside.

* * * * *